United States Patent
Günzel et al.

(10) Patent No.: US 11,891,064 B2
(45) Date of Patent: Feb. 6, 2024

(54) METHOD FOR OPERATING A BACKUP ASSISTANCE SYSTEM FOR A VEHICLE AND A BACKUP ASSISTANCE SYSTEM

(71) Applicant: Volkswagen Aktiengesellschaft, Wolfsburg (DE)

(72) Inventors: Thorben Günzel, Braunschweig (DE); Sebastian Munk, Wolfsburg (DE); Gregor Marek, Wendeburg (DE); Björn Zeise, Hildesheim (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 128 days.

(21) Appl. No.: 17/469,403

(22) Filed: Sep. 8, 2021

(65) Prior Publication Data

US 2022/0080970 A1 Mar. 17, 2022

(30) Foreign Application Priority Data

Sep. 11, 2020 (DE) .......................... 102020211461.7

(51) Int. Cl.
*B60W 30/18* (2012.01)
*B60W 60/00* (2020.01)
*B60W 50/08* (2020.01)
*B60W 50/00* (2006.01)

(52) U.S. Cl.
CPC .... *B60W 30/18036* (2013.01); *B60W 50/082* (2013.01); *B60W 60/0011* (2020.02); *B60W 2050/0008* (2013.01)

(58) Field of Classification Search
CPC ....... B60W 30/18036; B60W 60/0011; B60W 50/082; B60W 2050/0008
See application file for complete search history.

(56) References Cited

U.S. PATENT DOCUMENTS

| | | | | |
|---|---|---|---|---|
| 3,728,676 | A * | 4/1973 | Brown | B60Q 1/22 340/672 |
| 2008/0100428 | A1* | 5/2008 | Price | B60W 10/184 340/435 |
| 2010/0302069 | A1* | 12/2010 | Frank | G01S 15/931 340/932.2 |
| 2016/0202891 | A1* | 7/2016 | Hasedzic | B60R 1/00 715/771 |
| 2017/0158128 | A1* | 6/2017 | Jiang | B60Q 9/008 |
| 2019/0138017 | A1* | 5/2019 | Sarkar | G05D 1/0214 |

(Continued)

FOREIGN PATENT DOCUMENTS

| | | |
|---|---|---|
| DE | 102005009703 A1 | 9/2006 |
| DE | 102014213074 A1 | 1/2016 |

(Continued)

*Primary Examiner* — Yazan A Soofi
*Assistant Examiner* — Naeem Taslim Alam
(74) *Attorney, Agent, or Firm* — Peter Zura; LOZA & LOZA, LLP

(57) ABSTRACT

Technologies and techniques for operating a backup assistance system for a vehicle, wherein the backup assistance system enables travel in reverse along a previously travelled trajectory, wherein a maximum distance for the reverse travel along the previously travelled trajectory is determined and output using a control unit on the basis of an expected error for the reverse travel along the previously travelled trajectory, in which the expected error exceeds a predefined error threshold value.

20 Claims, 3 Drawing Sheets

(56) References Cited

U.S. PATENT DOCUMENTS

| | | | |
|---|---|---|---|
| 2019/0270451 A1* | 9/2019 | Liu | B62D 15/025 |
| 2020/0026296 A1 | 1/2020 | Hoedt | |
| 2020/0122717 A1* | 4/2020 | Kim | G06F 18/22 |
| 2020/0122775 A1* | 4/2020 | Hasejima | B62D 15/0285 |
| 2020/0180691 A1* | 6/2020 | Sandblom | B60W 30/18036 |
| 2020/0273344 A1* | 8/2020 | Staahl | B60W 30/09 |
| 2021/0118292 A1* | 4/2021 | Kitajima | G08G 1/056 |

FOREIGN PATENT DOCUMENTS

| | | |
|---|---|---|
| DE | 102015203016 A1 | 8/2016 |
| DE | 102015217555 A1 | 3/2017 |
| DE | 102016121465 A1 | 5/2018 |
| DE | 102016122760 A1 | 5/2018 |
| DE | 102017200215 A1 | 7/2018 |
| DE | 102017200216 A1 | 7/2018 |
| DE | 102017200218 A1 | 7/2018 |
| DE | 102017219874 A1 | 7/2018 |
| DE | 102018114497 A1 | 12/2019 |
| KR | 20190108687 A | 9/2019 |

\* cited by examiner

METHOD FOR OPERATING A BACKUP ASSISTANCE SYSTEM FOR A VEHICLE AND A BACKUP ASSISTANCE SYSTEM

CROSS REFERENCE TO RELATED APPLICATION

The present application claims priority to German Patent Application No. DE 10 2020 211 461.7, to Günzel, et al., filed Sep. 11, 2020, the contents of which is incorporated by reference in its entirety herein.

FIELD OF TECHNOLOGY

Aspects of the present disclosure are related to technologies and techniques for operating a backup assistance system for a vehicle, and a backup assistance system. Aspects of the present disclosure also relates to a vehicle.

BACKGROUND

There are backup assistance systems for vehicles that store a trajectory that has already been traveled (e.g., the last 50 meters) up to a maximum speed (e.g., 35 km/h), such that it can travel backwards over the same trajectory in a partially automated or automated manner.

A transport means, and a maneuvering assistance device and method for a transport means are known from DE 10 2015 217 555 A1. The method comprises the steps: determining correction values and measurements for the transport means when travelling a first distance, determining a first trajectory of the transport means for the first distance on the basis of the correction values and measurements, determining a desired trajectory for the transport means for the first trajectory, comparing the desired trajectory with a reference trajectory traveled at an earlier time, and if there is sufficient agreement, use of the correction values and measurements assigned to the reference trajectory for the maneuver assistance. The desired trajectory may correspond to backing up the transport means along the first trajectory.

A backup assistance system is known from DE 10 2014 213 074 A1 for a double-track motor vehicle with front wheel steering for backing up along a distance previously travelled manually in the forward direction. The backup assistance system allows at least an automatic steering of the motor vehicle during travel in reverse. The backup assistance system is configured to determine a value for a first characteristic variable at various positions the vehicle passes when travelling forwards for aligning the longitudinal axis of the vehicle at the various positions on the basis of a distance that has been traveled by the one rear wheel and a distance traveled by the other rear wheel. In particular, the values of the first characteristic variable (assigned to the respective positions) calculated for aligning the vehicle's longitudinal axis in forward travel are stored in a memory, and these values are then retrieved from the memory when backing up and used to steer the front wheels. A value of a second characteristic variable for the alignment at for various positions along the path traveled in reverse is then determined for the respective position based on a distance travelled by one rear wheel and a distance travelled by the other rear wheel. A value of the first variable that characterizes the alignment of the vehicle's longitudinal axis during the reverse travel for various positions along the distance travelled is then compared with a value of the second variable that characterizes the alignment of the vehicle's longitudinal axis when travelling in reverse at the same position, and the front wheels are then steered on the basis of this comparison.

Aspects of the present disclosure are related to improving operation of a backup assistance system for a vehicle and a backup assistance system.

SUMMARY

In some examples, a method is disclosed for operating a backup assistance system for a vehicle in which the backup assistance system at least partially automatically executes travel in reverse along a previously traveled trajectory, wherein a maximum distance for reverse travel along the previously travelled forward trajectory is determined and made available by a control unit on the basis of an error that can be expected for travelling in reverse along the previously travelled trajectory, wherein the maximum distance is that distance along the trajectory in which the expected error exceeds a predefined error threshold value.

A backup assistance system is also disclosed in which the backup assistance system can at least partially automatically execute reverse travel along a previously traveled trajectory, including a control unit, wherein the control unit is configured to determine and output a maximum distance for the reverse travel along the previously travelled trajectory on the basis of an error that can be expected for the reverse travel along the previously travelled trajectory, wherein the maximum distance is that distance along the trajectory in which an expected error exceeds a predefined error threshold value.

The method and backup assistance system make it possible to give a user of the backup assistance system feedback regarding a maximum distance, such that the user can best use the backup assistance system for his purposes. An error expected during reverse travel along the previously travelled trajectory is determined for this by means of a control unit. The expected error is caused in particular by a sensor system measurement error when registering the previously travelled trajectory, e.g., the vehicle odometry, as well as an actuator error, in particular for lateral and longitudinal steering of the vehicle, which is then used when travelling in reverse along the previously travelled trajectory. The invention is based on the knowledge that when travelling in reverse, the recorded, previously traveled trajectory can only be reproduced to a certain extent, wherein there is an error in the reverse travel, such as a deviation from the trajectory travelled in the forward direction. This error is a lateral deviation from the trajectory travelled in the forward direction when backing up, in particular. The lateral deviation when travelling along the trajectory is decisive, because an excessive deviation could lead to collisions with other objects (e.g., parked vehicles) next to the trajectory.

A maximum distance is determined by determining the expected error, wherein the maximum distance is that distance at which the expected error exceeds a predefined error threshold value when travelling in reverse along the trajectory.

One advantage of the method and backup assistance system is that a user may always be informed with regard to how far a previously travelled trajectory can be travelled in reverse in a partially automated or automated manner. In complex environments, a vehicle can therefore only by driven forwards by a user as long as the partially automatic or automatic reverse travel is still possible. This increases the convenience and safety for the driver when using the vehicle.

In some examples, a trajectory may be configured as a temporal or logical collection of measurement points or tuples, each of which comprises at least a steering angle and speed for the vehicle. The speed along the trajectory can alternatively be mapped via pairs of values comprising distances and time stamps, in order to store the average speed for a segment of the trajectory.

When determining the expected error, the following error sources may be taken into account: a vehicle odometry and/or measurement sensor system (in particular depending on the measurement principle that is used, and/or a speed of the vehicle, and/or respective measurement conditions, e.g. temperature, weather, etc.), storage errors (e.g. due to quantization, etc.) and/or errors that can be attributed to an actuator when travelling in reverse. The errors and their dependencies can be determined for the individual error sources on the basis of empirical tests in particular.

Parts of the backup assistance system, such as the control unit, can be implemented individually or collectively as a combination of hardware and software, e.g. in the form of program code that is executed on a microcontroller or microprocessor.

The determined maximum distance can be made available, e.g., by outputting the maximum distance on a display unit. The maximum distance can then be indicated directly to the user by this means. This maximum distance can be expressed as a numerical value, in the form of a bar graph, and or in Harvey balls. A trajectory shortened to a maximum distance can also be displayed, e.g., as a projection onto a roadmap (e.g., in the navigation display for a navigation system) or in an image (e.g. from a backup camera system).

In the various examples, a vehicle is a motor vehicle. Of course, a vehicle can also be some other land, water, rail, air, or space vehicle.

Further features of the design of the backup assistance system can be derived from the description below. The advantages of the backup assistance system are the same as those of the embodiments of the method.

Furthermore, a vehicle is also disclosed, comprising at least one backup assistance system according to any of the embodiments described herein.

BRIEF DESCRIPTION OF THE DRAWINGS

The present disclosure shall be described below in greater detail based on preferred exemplary embodiments in reference to the drawings. Therein.

DETAILED DESCRIPTION

Figure 1:
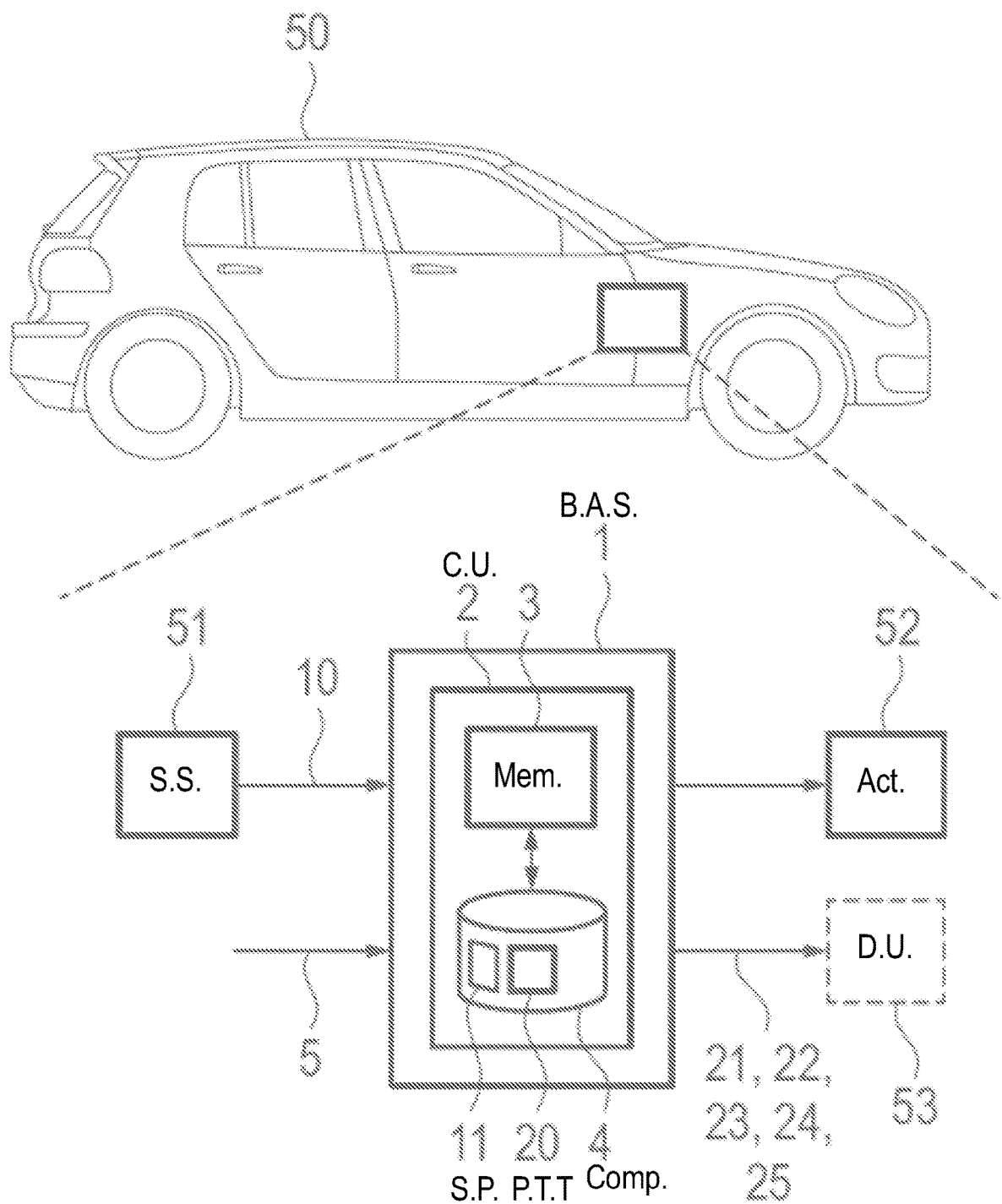
FIG. 1 shows a schematic illustration of an embodiment of the backup assistance system according to some aspects of the present disclosure.

In some examples, the distance that can be travelled by a vehicle in reverse may be limited to the determined maximum distance. As a result, when using the backup assistance system, it is possible to prevent travelling in reverse over the previously travelled trajectory in excess of an acceptable error. This increases the safety when operating the backup assistance system, because a predefined maximum deviation from the previously travelled trajectory is always maintained. In particular, the maintaining of this limit to the maximum distance can be checked by the control unit. In particular, the control unit can interrupt or terminate the reverse travel if the results of this check indicate that the maximum distance has been reached.

In some examples, a previously travelled trajectory may be subdivided into trajectory segments, based on the shapes of these segments, to determine the expected error, wherein an expected error for the respective trajectory segment is determined, starting at least from a respective shape of the trajectory segment and a speed at which the respective trajectory segment was travelled in the forward direction, wherein the expected error when travelling in reverse over the previously travelled trajectory is determined in the backward direction from the expected errors for the trajectory segments. As a result, an error can be determined more precisely, specifically as a function of a shape of the trajectory or the trajectory segment, and a speed, or a speed profile. This approach is based on the knowledge that a precision when re-travelling, in particular in reverse, a previously travelled trajectory is substantially dependent on a shape of the trajectory, or a shape of trajectory segments, and speed of the vehicle when recording the previously travelled trajectories along the trajectory segments. In other words, a previously travelled trajectory is subdivided into trajectory segments based on the shape of the trajectory and/or the shapes of individual trajectory segments.

By way of example, straight trajectory segments can be distinguished from bowed or curved trajectory segments. Distinctions can also be made between different curvatures or radii (e.g., travelling in a straight line, spiral, S-curves, right angle turns, or turning 180°, etc.). An error is then determined, e.g., estimated, for each of the trajectory segments obtained in this manner, based at least on the shape and the speed at which this trajectory segment was travelled. The respective errors determined for individual trajectory segments are then cumulated, e.g., absolute errors can be determined and then added together according to the laws of error propagation. This takes place in particular starting from one end of the previously travelled trajectory or a current position of the vehicle on the previously travelled trajectory. During the accumulation, it is taken into account in particular that the overall error can decrease if the movements along the trajectory segments cancel one another out. The accumulated error values obtained by including another pending trajectory segment are then compared with the predefined error threshold value. If the error threshold value is exceeded, the trajectory segment regarded in the previous step is then used as a reference for determining the maximum distance, such that the maximum distance comprises all of the distances of the trajectory segments taken into account in the preceding steps.

In some examples, a previously travelled trajectory may be subdivided into trajectory segments of different shapes in order to determine the expected error, and a number of measurement points have been or are determined that represent the respective trajectory segments, starting at least from a respective shape of the trajectory segment and a speed at which the trajectory segment was travelled in the forward direction, wherein the maximum distance and/or the predefined error threshold value is or has been predefined in the form of a maximum number of measurement points. The subdivision of the previously travelled trajectory into individual trajectory segment is analogous to that in the example described above. However, in this example, the trajectory segments are represented by a predefined number of measurement points. This can already take place, or has already taken place, while recording the previously travelled trajectory.

By way of example, a number of detected and/or recorded measurement points (tuples in each case, composed of at least one steering angle and one speed) can be determined on the basis of a steering angle and a speed (during the recording). The predefined number of measurement points representing the respective trajectory segment may be determined at least on the basis of a respective shapes of the trajectory segments and speeds at which the respective trajectory segments were travelled in the forward direction. This takes place in particular in that the number of measurement points is greater if the complexity of the trajectory segment under consideration is also greater. A straight trajectory segment can therefore be sufficiently defined by just two points, while a curved trajectory segment with a very small radius requires a larger number of measurement points for an adequate representation. A maximum distance and/or the predefined error threshold value are defined herein in particular in that a maximum number of measurement points is defined or has been defined. This approach is based on the idea in particular that the number of measurement points with which a trajectory segment is represented is or has been selected such that an error input can be kept more or less constant for each measurement point. More complex trajectory segments require a larger number of measurement points and therefore result in greater error inputs of the trajectory segment to obtain an overall error when travelling in reverse along the previously travelled trajectory. The maximum error can be limited by predefining a maximum number of measurement points. The maximum distance can then be determined by the predefined number and the respective number of measurement points for each trajectory segment. The maximum distance is then that distance in particular at which a number of measurement points exceeds the maximum number of measurement points.

In some examples, values for the respective determined shapes and the respective speeds are obtained from a table to determine the expected error for the trajectory segments or the number of measurement points. As a result, the respective errors can be quickly determined for various combinations of shapes and speeds. The entries in such a table can be determined empirically, for example, for various combinations of shapes (e.g., curves with different radii) and speeds. This empirically determined table is then stored in a memory in the control unit, such that the control unit can access them when using the method.

In some examples, classification and/or pattern recognition may be carried out to determine the shapes of trajectory segments. As a result, errors can also be estimated for unfamiliar shapes. A trajectory segment is then classified according to different classes of shapes. The error can then be determined or estimated on the basis of the respective class of shapes assigned thereto. This takes place by means of a classification unit, for example. Machine learning and artificial intelligence methods can also be used for this, by way of example.

In some examples, a maximum distance that can still be stored is determined and output on the basis of a remaining storage capacity of a memory in which previously travelled trajectories are or have been stored. As a result, the user of a backup assistance system also receives information regarding how long the previously travelled trajectory can still be such that it can still be travelled in reverse in a partially automatic or automatic manner by means of the backup assistance system. Convenience and safety when operating the backup assistance system can be further increased by this.

In some examples, a starting point can be or has been set on the previously travelled trajectory, wherein after this starting point has been determined, a distance from a current position of the vehicle on the previously travelled trajectory to the set starting point is determined, wherein the determined distance is compared with the determined maximum distance, and wherein a warning signal is generated and output if the determined distance is greater than the maximum distance. The user of the backup assistance system can therefore be warned if it is not possible to travel the previously travelled trajectory all the way back to the set starting point in reverse ("point of no return"). This may be advantageous in challenging driving situations (e.g., narrow parking spaces, lack of turning possibility, etc.). The warning signal can be optical, acoustic, and/or tactile. The starting point can also be displayed in a display unit (e.g., the navigation screen for the navigation system). The warning can also be in the form of a message, to make the user of the vehicle aware of the possibility of using the backup assistance system.

In some examples, a previously travelled distance may be determined after starting to record the previously travelled trajectory, wherein a difference between the determined maximum distance and the previously travelled distance is determined and output. As a result, a remaining distance can be estimated in particular, based on a remaining error to the predefined error threshold value. An error calculated in reverse for the previously travelled trajectory is calculated in the manner described above for this. The difference between the determined maximum distance and the previously travelled distance can then be estimated from the difference between the calculated error and the predefined error threshold value.

In some examples, a previously travelled distance is determined and output after starting recording of the previously travelled trajectory.

Situations may be identified in which the backup assistance system can be used, wherein a message is generated and output to make the user of the vehicle aware of the possibility of using the backup assistance system. The situation can be identified, e.g., by means of the control unit and/or by means of environment detection and/or environment recognition, in particular by means of an environment recognition unit. Alternatively or additionally, the situation can also be identified on the basis of map data, e.g., based on a vehicle position (with map data, e.g., from a navigation system, a backend server, on the basis of group data/user profiles for other users, etc.) By way of example, the following situations can be identified: dead end streets without turning possibilities, narrow parking spaces or parking garages.

In some examples, a starting point may be set on the previously travelled trajectory if a situation is identified in which the backup assistance system can be used. In particular, the control unit sets the starting point.

A situation may be identified, for example, if the vehicle is in a dead end, or has travelled from a public area into a private area (e.g. private property, parking lot, parking garage), and a narrow space has been detected by means of the control unit and/or environment recognition unit. A narrow space can be defined for this via a stored width and length. The start of the dead end, or the transition from a public area to a private area can also be automatically set as the starting point.

The message can be output to the driver as soon as the reverse gear has been selected, or the distance from the current position of the vehicle on the previously travelled trajectory to the automatically set starting point is greater than the maximum distance. The message can be output acoustically, optically, and/or in a tactile form, e.g., by outputting a message and/or emphasizing the activation possibility for the backup assistance system.

A schematic illustration of an embodiment of the backup assistance system 1 is shown in FIG. 1. The backup assistance system 1 is configured in this example in a vehicle 50. The backup assistance system 1 enables travel in reverse on a previously traveled trajectory 20. By way of example, the recording of the trajectory 20 can be started manually or automatically when the vehicle 50 is moving at a speed of less than 35 km/h, for example. By way of example, a trajectory 20 of 50 meters can be recorded. Sensor data 10 from a sensor system 51 in the vehicle are obtained and recorded to record the trajectory 20. The sensor system 51 detects in particular at least a steering angle and a speed of the vehicle 50. Control data from an actuator 52 in the vehicle 50, e.g., a longitudinal and lateral control, may also be recorded. Other data may also be recorded while travelling the trajectory 20, e.g., position data for the vehicle, control data for an actuator, and/or sensor data from sensors in the vehicle.

The backup assistance system 1 includes a control unit 2. The control unit 2 includes a computer 3 and a memory 4. The recorded trajectory 20 is stored in the memory 4. For travelling along the previously travelled trajectory 20 in reverse, the control unit 2 activates the actuator 52 in the vehicle 50.

The control unit 2 may be configured to determine a maximum distance 21 for the reverse travel along the previously travelled trajectory 20 depending on an expected error for the reverse travel. The maximum distance 21 is that distance in which an expected error falls below a predefined error threshold value 5. The error threshold value 5 is supplied externally to the backup assistance system 1, or it is stored in the memory 4 in the control unit 2. The maximum distance is determined in particular according to an embodiment described in reference to FIGS. 2 and 3.

The determined maximum distance 21 is subsequently displayed on a display unit 53 in the vehicle 50, such that a user can see it.

The distance that can be travelled in reverse may be limited to a maximum distance 21. As a result, it may only be possible to travel the previously travelled trajectory 20 in reverse for the maximum distance 21 that has been determined.

A maximum distance 22 may be determined and output by means of the control unit 2 on the basis of a remaining storage capacity in the memory 4 in which the previously travelled trajectory 20 has been or is stored. The distance 22 that can still be stored can then be displayed on the display unit 53 in the vehicle 50, for example.

It may be possible to set a starting point 11 on the previously travelled trajectory 20, wherein a distance from a current position of the vehicle 50 along the previously travelled trajectory 20 to the set starting point 11 is determined after setting the starting point 11, wherein the determined distance is then compared with the determined maximum distance, and wherein a warning signal 23 is generated and output if the determined distance is greater than the maximum distance 21.

A starting point 11 may be set on the previously travelled trajectory 20 is a situation has been identified in which the backup assistance system 1 can be used.

After starting a recording of the previously travelled trajectory 20, a previously travelled distance 24 may be determined by the control unit 2, wherein the difference 25 between the determined maximum distance 21 and the previously travelled distance 22 is determined and output.

A previously travelled distance 24 can also be determined and output after starting a recording of the previously travelled trajectory 20.

The previously travelled trajectory 20 and/or the maximum distance 21 and/or the maximum distance 22 that can still be stored, and/or the previously travelled distance 24, and/or the difference 25 may be displayed graphically on the display unit 53, such that a user can more easily see them. Numbers, and/or bar graphs, and or Harvey balls may be used for this display.

Figure 2:
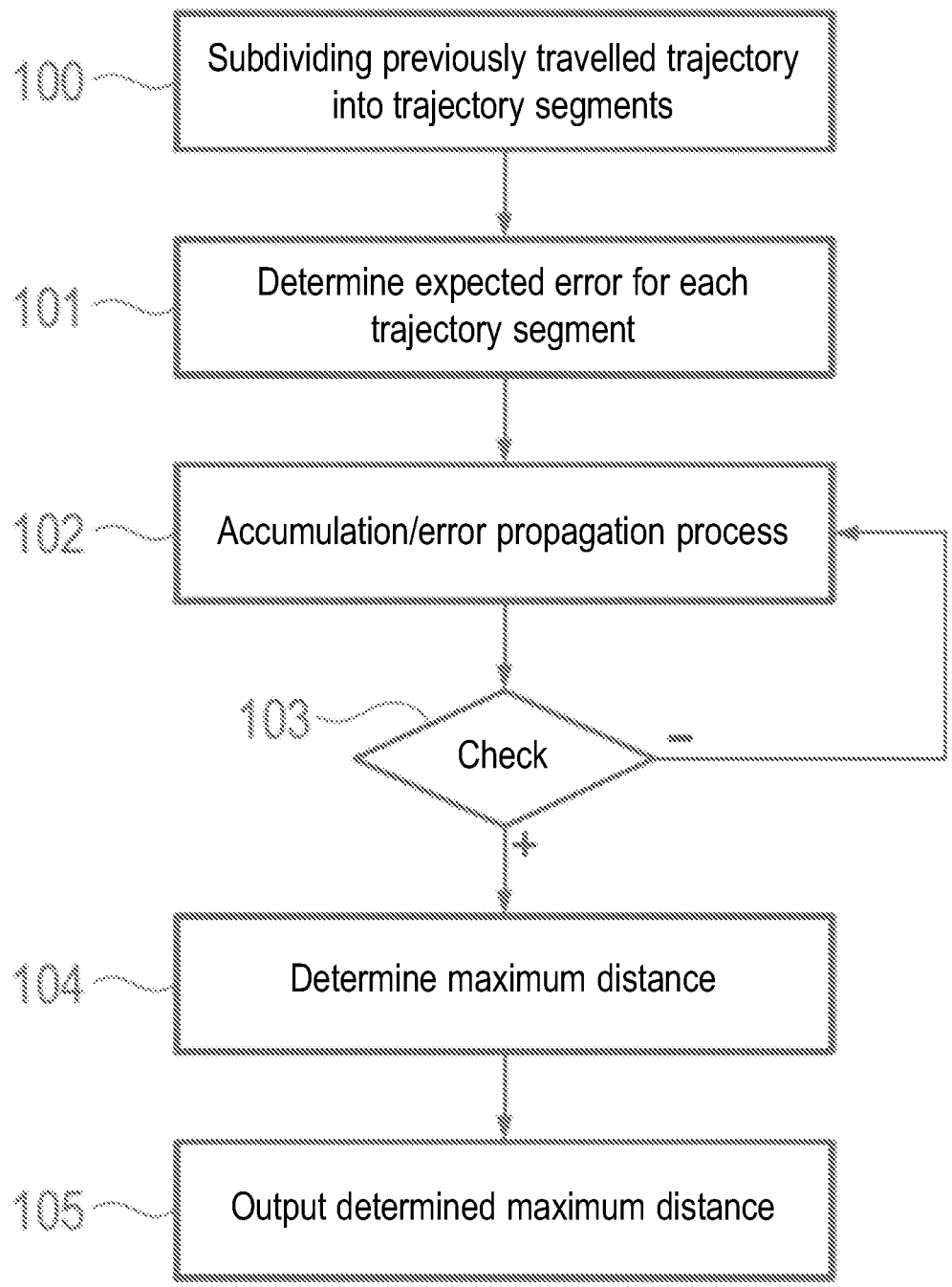
FIG. 2 shows a schematic flow chart for an embodiment of the method for operating a backup assistance system for a vehicle according to some aspects of the present disclosure.

A schematic flow chart of an embodiment of the method for operating a backup assistance system for a vehicle is shown in FIG. 2.

The starting point for the method is that a previously travelled trajectory is recorded. The recording can also be part of the method.

The previously travelled trajectory is subdivided into trajectory segments in step 100. This takes place on the basis of the shapes of respective trajectory segments, and the speeds at which the respective trajectory segments are travelled.

A classification and/or pattern recognition may take place to determine the shapes of the trajectory segments. Machine learning and artificial intelligence may be used for this. The result is a classification of combinations of shapes and speeds. The shape comprises different curvatures or radii of the trajectory segments (e.g., straight lines, various spirals, S-curves, right angle turns, 180° turns, etc.).

An expected error is determined for each trajectory segment in step 101. Values for the respective expected errors may be obtained from a table on the basis of the respective determined shapes and respective speeds. The table is compiled in advance, e.g., on the basis of empirical testes. The table is stored, e.g., in a memory in a control unit for the backup assistance system. The control unit for the backup assistance system can then obtain an expected error for the reverse travel along the trajectory segment in question from the table for every combination of shape and speed.

The respective determined errors for the trajectory segments are accumulated in steps by means of an error propagation process in step 102, such that an overall error can be determined. By way of example, absolute errors can be combined according to the law of error propagation for this. This takes place starting from one end of the previously travelled trajectory.

After every subsequent trajectory segment that is added, it is checked in step 103 whether or not the determined expected (overall) error exceeds a predefined error threshold value. If the expected error does not exceed the predefined error threshold value, step 102 is repeated and another trajectory segment is added.

If the expected error exceeds the predefined error threshold value, a maximum distance for travelling in reverse along the previously travelled trajectory is determined in step 104. The distances of the previously added trajectory segments can be combined for this, and output as maximum distances. Alternatively, the last trajectory segment added while determining the maximum distance may not be taken into account if the predefined error threshold value is exceeded when this trajectory segment is added.

The determined maximum distance is output in step 105, e.g., on a display unit in the vehicle. The distance that can be travelled in reverse may be limited to the determined maximum distance.

Figure 3:
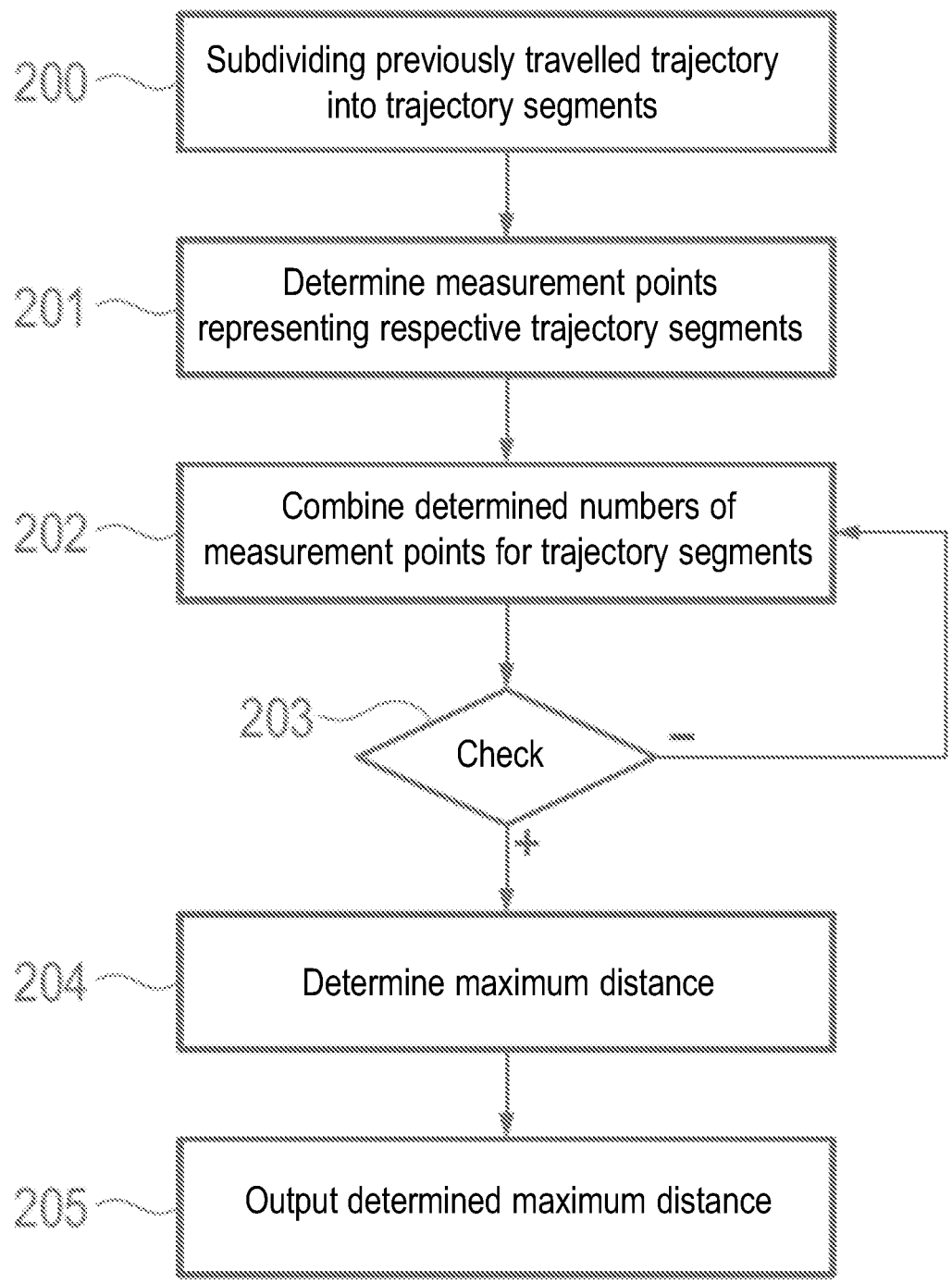
FIG. 3 shows a schematic flow chart for another embodiment of the method for operating a backup assistance system for a vehicle according to some aspects of the present disclosure.

A schematic flow chart of an embodiment of the method for operating a backup assistance system for a vehicle is shown in FIG. 3. The starting point for the method is that a previously travelled trajectory has been recorded. The recording also be part of the method itself.

The previously travelled trajectory is subdivided into trajectory segments in step 200. This takes place depending on the shapes of the respective trajectory segments and the speeds at which the trajectory segments are travelled.

Classification and/or pattern recognition may be carried out to determine the shape of the trajectory segments. Machine learning and artificial intelligence may be used for this. The result is, e.g., a classification of combinations of shapes and speeds. The shape comprises, e.g., different curvatures or radii of the trajectory segments (e.g., straight line, various spirals, S-curves, right angle turns, 180° turns, etc.).

A number of respective measurement points that represent respective trajectory segments are determined in step 201. This takes place on the basis of at least one shape of the trajectory segment and a speed at which the respective trajectory segment has been travelled in the forward direction. Values for the number of measurement points are then obtained from a table on the basis of the respective shape and the respective speed that have been determined to determine these measurement points. The table is compiled in advance, e.g., on the basis of empirical tests. The table is stored in a memory in the control unit for the backup assistance system, for example. An associated necessary number of measurement points for travelling in reverse on the trajectory segment in question can be obtained from the table for every combination of shape and speed. It is assumed that each measurement point basically contributes the same amount to an overall error.

The respective determined numbers of measurement points for the trajectory segments are then combined in step 202, such that an overall number of measurement points can be determined. This takes place starting from one end of the previously travelled trajectory.

After each successive trajectory segment, it is checked in step 203 whether or not the determined number of measurement points exceeds a predefined maximum number of measurement points. The predefined maximum number of measurement points is equal to a predefined error threshold value, in particular. If the determined number of measurement points does not exceed the predefined maximum number, step 202 is repeated, and another trajectory segment is added.

If the determined number does not exceed the predefined maximum number, a maximum distance for travelling in reverse along the previously travelled trajectory is determined in step 204. The distances of the previously travelled trajectory segments can be combined for this and output as maximum distances. Alternatively, the last trajectory segment may not be taken into account in determining the maximum distance if the predefined maximum number of measurement points is exceeded when this trajectory segment is added.

The determined maximum distance is output in step 205, e.g., on a display unit in the vehicle. The distance that can be travelled in reverse may be limited to the determined maximum distance.

LIST OF REFERENCE SYMBOLS

1 backup assistance system
2 control unit
3 memory
4 computer
5 error threshold value
10 sensor data
11 starting point
20 previously travelled trajectory
21 maximum distance
22 distance that can still be stored
23 warning signal
24 previously travelled distance
25 difference
50 vehicle
51 sensor system
52 actuator
53 display unit
100-105 steps of the method
200-205 steps of the method

The invention claimed is:

1. A method for operating a backup assistance system of a vehicle, comprising:
   determining, via a control unit, an expected error for reverse travel, wherein the expected error comprises a calculation of a predicted future error determined from travel along a previously travelled trajectory;
   determining, via the control unit, if the expected error for reverse travel meets or exceeds a predefined error threshold value;
   determining, via the control unit, a maximum distance for the reverse travel along the previously-travelled trajectory based on the expected error meeting or exceeding the predefined error threshold value; and
   executing an at least partially autonomous reverse travel for the vehicle based on the determined maximum distance.

2. The method of claim 1, wherein executing the at least partially autonomous reverse travel comprises limiting a distance that can be travelled in reverse to the determined maximum distance.

3. The method of claim 1, wherein determining the expected error for reverse travel along the previously travelled trajectory comprises:
   subdividing the previously travelled trajectory into trajectory segments based on shapes of the trajectory segments;
   determining an expected error for each respective trajectory segment, based on a respective shape of the trajectory segment and a respective speed at which the respective trajectory segment was travelled in a forward direction; and
   determining one of
   a respective expected error when travelling in reverse over the previously travelled trajectory in a backward direction for each of the trajectory segments, or
   a number of measurement points representing a respective trajectory segment, wherein the maximum distance and/or the predefined error threshold value is configured as a maximum number of measurement points.

4. The method of claim 3, wherein determining the expected error for reverse travel along the previously travelled trajectory comprises obtaining values from a table based on the respective determined shape and the respective speed to determine the respective expected error for the trajectory segments or the number of measurement points.

5. The method of claim 1, further comprising determining a maximum distance that can be stored, depending on a remaining storage capacity in a memory.

6. The method of claim 1, further comprising
setting a starting point on the previously travelled trajectory;
determining a distance from a current position of the vehicle on the previously travelled trajectory to the set starting point;
comparing the determined distance with the determined maximum distance; and
generating a warning signal if the determined distance is greater than the maximum distance.

7. The method of claim 1, further comprising setting a starting point on the previously travelled trajectory when the backup assistance system is activated.

8. A backup assistance system for a vehicle, comprising:
an actuator; and
a control unit, wherein the control unit is configured to
determine an expected error for reverse travel, wherein the expected error comprises a calculation of a predicted future error determined from travel along a previously travelled trajectory;
determine if the expected error for reverse travel meets or exceeds a predefined error threshold value;
determine a maximum distance for the reverse travel along the previously-travelled trajectory, based on the expected error meeting or exceeding the predefined error threshold value; and
execute an at least partially autonomous reverse travel for the vehicle via the actuator based on the determined maximum distance.

9. The backup assistance system of claim 8, wherein the control unit is configured to execute the at least partially autonomous reverse travel by limiting a distance that can be travelled in reverse to the determined maximum distance.

10. The backup assistance system of claim 8, wherein the control unit is configured to determine the expected error for reverse travel along the previously travelled trajectory by:
subdividing the previously travelled trajectory into trajectory segments based on shapes of the trajectory segments;
determining an expected error for each respective trajectory segment, based on a respective shape of the trajectory segment and a respective speed at which the respective trajectory segment was travelled in a forward direction; and
determining one of
a respective expected error when travelling in reverse over the previously travelled trajectory in a backward direction for each of the trajectory segments, or
a number of measurement points representing a respective trajectory segment, wherein the maximum distance and/or the predefined error threshold value is configured as a maximum number of measurement points.

11. The backup assistance system of claim 10, wherein the control unit is configured to determine the expected error for reverse travel along the previously travelled trajectory by obtaining values from a table based on the respective determined shape and the respective speed to determine the respective expected error for the trajectory segments or the number of measurement points.

12. The backup assistance system of claim 8, wherein the control unit is further configured to determine a maximum distance that can be stored, depending on a remaining storage capacity in a memory.

13. The backup assistance system of claim 8, wherein the control unit is configured to
set a starting point on the previously travelled trajectory;
determine a distance from a current position of the vehicle on the previously travelled trajectory to the set starting point;
compare the determined distance with the determined maximum distance; and
generate a warning signal if the determined distance is greater than the maximum distance.

14. The backup assistance system of claim 8, wherein the control unit is configured to set a starting point on the previously travelled trajectory when the backup assistance system is activated.

15. A method for operating a backup assistance system of a vehicle,
comprising:
obtaining a previously travelled trajectory;
subdividing the previously travelled trajectory into trajectory segments based on shapes of the trajectory segments;
determining an expected error for each respective trajectory segment, wherein the expected error comprises a calculation of a predicted future error determined from travel based on a respective shape of the trajectory segment and a respective speed at which the respective trajectory segment was travelled in a forward direction
determining a respective expected error for reverse travel along the previously travelled trajectory;
determining if the respective expected error for reverse travel meets or exceeds a predefined error threshold value;
determining, via the control unit, a maximum distance for the reverse travel along the previously-travelled trajectory based on the respective expected error meeting or exceeding the predefined error threshold value; and
executing an at least partially autonomous reverse travel for the vehicle based on the determined maximum distance.

16. The method of claim 15, wherein executing the at least partially autonomous reverse travel comprises limiting a distance that can be travelled in reverse to the determined maximum distance.

17. The method of claim 15, wherein determining the expected error for reverse travel along the previously travelled trajectory comprises determining one of (i) a respective expected error when travelling in reverse over the previously travelled trajectory in a backward direction for each of the trajectory segments, or (ii) a number of measurement points representing a respective trajectory segment, wherein the maximum distance and/or the predefined error threshold value is configured as a maximum number of measurement points.

18. The method of claim 17, wherein determining the expected error for reverse travel along the previously travelled trajectory comprises obtaining values from a table based on the respective determined shape and the respective speed to determine the respective expected error for the trajectory segments or the number of measurement points.

19. The method of claim 15, further comprising determining a maximum distance that can be stored, depending on a remaining storage capacity in a memory.

20. The method of claim 15, further comprising
setting a starting point on the previously travelled trajectory;
determining a distance from a current position of the vehicle on the previously travelled trajectory to the set starting point;
comparing the determined distance with the determined maximum distance; and
generating a warning signal if the determined distance is greater than the maximum distance.

* * * * *